3,015,637
ORGANO SILOXANE-ALKYD RESIN COATING
COMPOSITIONS
Lawrence A. Rauner and Leslie J. Tyler, Midland, Mich., assignors to Dow Corning Corporation, Midland, Mich., a corporation of Michigan
No Drawing. Filed Mar. 27, 1959, Ser. No. 802,284
2 Claims. (Cl. 260—22)

This invention relates to novel coating compositions and a method of preparing these compositions.

Silicone resins based on organosiloxane polymers have been employed in coating compositions for several years. These resins are employed alone, admixed with organic resins and copolymerized with organic resins. However, it is often difficult, expensive and time consuming to prepare the copolymers of organic resins and silicone resins. Hence such materials have not gained the widespread use predicted for them.

It is the object of this invention to provide a commercially satisfactory means of copolymerizing certain organic materials with silicone resins. A further object is to produce a new heat-stable commercially attractive coating composition. Other objects and advantages of this invention are detailed in or will be apparent from the disclosure and claims.

This invention relates to the copolymerization of an alkyd or an oil modified alkyd with a reactive organosiloxane resin employing titanium or zirconium compounds as catalysts.

The organic materials employed herein are alkyds and oil-modified alkyds. The alkyds are reaction products of any polyhydric alcohol and any polycarboxylic acid. The polyhydric alcohols include but are not restricted to pentaerythritols, glycerine, trimethylolethane, trimethylolpropane, sorbitol, ethylene glycols, butylene glycols, neopentyl glycols, polyethanolamines, hexanetriol, and bisphenol alkylene oxide adducts.

The polycarboxylic acid reactant employed to prepare the alkyds can be the acid, the anhydride of such acids, if any, or an ester of such acids. Operable acids include phthalic acid, maleic acid, isophthalic acid, terephthalic acid, malonic acid, fumaric acid, succinic acid, adipic acid, trimellitic acid, glutaric acid, pimelic acid, suberic acid, azelaic acid, sebacic acid, itaconic acid and aconitic acid. Anhydrides of the foregoing acids and alkyl esters of such acids can also be employed. The preferred acids and the most commonly used are phthalic acid, isophthalic acid, terephthalic acid, and maleic acid or the anhydrides or lower alkyl esters, particularly methyl esters of such acids.

The operable alkyd resins can be modified with fatty acids. A partial list of the fatty acids which can be used includes propionic, octanoic, capric, lauric, oleic, erucic, ricinoleic, linoleic, linolenic, arachidonic, caproic, caprylic, myristic, palmitic, stearic, behenic, lignoceric, lauroleic, myristoleic, palmitoleic, gadoleic, elaeostearic, liconic and clupanodonic.

The polyhydric alcohols, polycarboxylic acids and esters and anhydrides thereof and fatty acids noted above are well-known ingredients of alkyd resins and oil or fatty acid modified alkyd resins. Methods of preparation of such materials are known and their use in alkyds is an established practice well documented in the literature of the art.

The organosiloxane resins employed in this invention are well-known materials often used in conjunction with alkyd or oil-modified alkyd resins either as mixtures or as copolymers. These resins are of the general unit formula

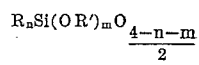

where each R is a monovalent hydrocarbon radical, each R' is a hydrogen atom or alkyl radical of less than 6 carbon atoms, $n$ has an average value of 0.90 to 1.90, and $m$ has an average value of .1 to 1.5. These resins are predominantly copolymers of monoorganosiloxane units and diorganosiloxane units but limited amounts of triorganosiloxane units and $SiO_{4/2}$ units can be present. The organic substituents represented by R include alkyl radicals such as methyl, ethyl, hexyl and octadecyl, aryl radicals such as phenyl and tolyl, aralkyl radicals such as benzyl and phenylethyl, alkaryl radicals such as tolyl and methylnaphthyl, cycloaliphatic radicals such as cyclopropyl and cyclopentyl and alkenyl radicals such as alkyl and octadecenyl. The —OR' substituents include the hydroxyl radical and alkoxy radicals of less than 6 carbon atoms such as methoxy and butoxy.

The siloxane resins are prepared by known methods. Generally, an alkoxy organosilane is partially hydrolyzed thus replacing some of the alkoxy substituents with hydroxy groups and the hydrolyzate is condensed to produce the desired alkoxylated siloxane resin. The resin can contain some residual —OH groups if the hydrolyzate is not completely condensed. An alkoxy-organosilane or a halogenoorganosilane can be completely hydrolyzed replacing all of the alkoxy substituents or halogen substituents with —OH groups and the resulting hydrolyzate can then be partially condensed to produce the desired hydroxylated siloxane resins. These methods are well known and the method of preparing the siloxane resins ingredient is not critical to this invention.

The catalysts employed in this invention are metallic esters of the general formula $M(OR'')_4$ where M is a titanium atom or a zirconium atom and each R'' is a monovalent hydrocarbon radical or acyl radical. The substituents represented by R'' can be any alkyl, aryl, alkenyl, aralkyl, and alkaryl radical as well as an acyl radical. In any compound, all R'' substituents can be the same or they can be different. Examples of suitable catalysts are $M(OC_6H_5)_4$, $M(OC_3H_7)_4$, $M(OC_4H_9)_4$, $M(OC_2H_5)_4$, $M(OC_2H_5)_3(OC_6H_5)$, $M(OCH_3)_3(OC_2H_5)$, $M(OCH_2C_6H_5)_4$, $M(OC_6H_4CH_3)_4$, and $$M(OCH_3)(OC_2H_5)(OC_6H_5)(OC_4H_9)$$

Especially useful because of their availability and cost are the alkyl titanates of the formula $Ti(OC_aH_{2a+1})_4$ where $a$ is 1 to 20. Also operative are titanium acylates. These acylates may be of the formula $Ti(OR)_4$ where R is an acyl radical. The commercially available acylates are of the formula $(R'O)_3Ti(OR)$ where R' is an alkyl radical or hydrogen atom and R is an acyl radical.

The titanium and zirconium compounds operable herein as catalytic agents for the reaction include polymeric titanates and zirconates prepared by partial hydrolysis and condensation of the compounds of the formula $M(OR'')_4$ as defined above. Thus isopropoxy titanium acylates of the formula

where Pr is isopropoxy, R is alkyl and $x$ is a positive integer are operable. Such polymeric titanates and zirconates are known materials.

The reactants can be added in any desired order. All of the reactants can be mixed together and the titanate or zirconate catalyst added. Alternatively, a preformed alkyd or oil-modified alkyd containing residual reactive sites (alcoholic —OH or carboxylic —COOH) can be employed as a starting material with the alkoxylated or hydroxylated siloxane. Other alternative orders of reaction are obvious and are included within the scope of this application.

In addition to the reactants and the catalysts outlined above, an organic solvent can be employed in the reaction mixture. The solvent is not required but will often facilitate handling and stirring of the reaction mass. The use of a solvent will also assure more complete and more rapid reaction by providing uniform, intimate contact between the reactants. Operable solvents include low boiling alcohols, aromatic hydrocarbon solvents, aliphatic hydrocarbon solvents, hydrocarbon esters, ketones, and chlorinated hydrocarbon solvents and mixtures of the foregoing.

The reactants can be employed over wide ranges of proportions. The alkyd resin can be oil modified and can have an oil length extending from very short oil length through very long oil length (e.g. 5 percent oil modified to 90 percent oil modified). The organosiloxanes can be employed in the range of from .5 percent to 90 percent by weight of the total resin. The catalyst should be present in amount sufficient to give at least .01 percent by weight based on the resin reactants of metallic titanium or zirconium. Less than .01 percent of the catalytic metal produces no significant effect on the reaction. For many uses, there is no operable upper limit on the amount of catalyst employed but cost considerations and color integrity of the ultimate resin dictate that no more than 3 percent by weight of the metal be present. Thus, the practical and effective range of the catalyst is from .01 percent to 3.0 percent by weight of metal based on the weight of the resinous reactants. The preferred range of catalyst within which effective catalysis is achieved without color degradation in the ultimate resin is from .1 percent to 1.5 percent metal added as the defined compound.

The reactants, catalyst alnd solvent, if desired, are mixed together and heated. Reaction begins at an appreciable rate at 100° C. The reaction rate increases as the reaction temperature is increased. However, above about 210° C. the reaction is so rapid that it is difficult to control. Thus the preferred range of reaction temperature is 100° to 210° C. and the optimum of reaction rate, controllability and product quality is achieved at 110° to 200° C.

The reaction is carried forward until the reaction mixture becomes homogeneous and the ultimate resin cures to a clear compatible film. A single phase solution is obtained. In many cases the reaction can be charted by measuring the condensation products distilling over. Thus the amount of water, methylalcohol or other condensation by-product can be measured as it distills out of the reaction mass and compared to the theoretical amount to be expected.

The method of this invention provides a rapid, efficient method of preparing silicone-alkyd and silicone-oil modified-alkyd resins for use as protective coating materials. These resins are particularly useful in paints where they can be the basis for air dried and heat cured paints. The titanium and zirconium catalysts employed to secure reaction between the resin reactants also serves as a drier in the coating film.

The following examples are included to aid in understanding and practicing this invention. The examples do not delineate the scope of the invention and should not be considered as restrictive in any way. All parts and percentages in the examples are based on weight unless otherwise indicated.

*Example 1*

An alkyd was prepared by reacting 115 parts of isophthalic acid and 110 parts trimethylolpropane at 220° C. for 7 hours. During the reaction, 25.6 parts of water were removed from the reaction zone. The alkyd was placed in solution in 200 parts of beta-ethoxyethylacetate ($CH_3COOCH_2CH_2OC_2H_5$). A mixture of 54 parts of this alkyd solution, 9 parts butylacetate and 9 parts of a reactive siloxane copolymer of 70 mol percent monophenylsiloxane units and 30 mol percent monopropylsiloxane units with residual hydroxyl groups (OH/Si=about 1/3) and residual isopropoxy groups (1 to 2 weight percent) was placed in a glass reaction vessel. The reaction mass was heated and stirred at 140° to 145° C. for 9 hours. The result of this heating was that six parts of water were azeotroped from the mass and the mass remained in two layers. Thus substantially no reaction had occurred. .1 part of butyltitanate [$Ti(OBu)_4$] and 10 parts butylacetate were added to the reaction vessel and the mass reheated to 135° to 140° C. for 7.5 hours. The reaction mass became homogeneous and clear and 92% of theory of condensation by-products were removed showing that the reaction had occurred. The product was filtered and a clear compatible silicone modified alkyd resin was obtained.

*Example 2*

A 1 liter, three-necked flask fitted with thermometer and stirrer was charged with 280 g. of a soya oil modified phthalic anhydride-glycerine alkyd in 120 g. of the reactive siloxane resin described in Example 1, 119 g. naphthal mineral spirits and 27 parts xylene were added to the flask. One gram of tetrabutyl zirconate was added to the reaction mass and the mass was heated to reflux (160°–163° C.) with concurrent stirring under nitrogen. After 2 hours 45 minutes of refluxing, a compatible, single phase, clear resin solution was obtained. A drop of the resin on a glass slide was cured at 150° C. for 15 minutes and a clear film was obtained indicating reaction between the siloxane and oil modified alkyd. The resin was diluted to 55 percent solids by addition of Stoddard solvent. The resulting resin solution had a specific gravity of 0.936 and a viscosity of 563 cs. at 25° C. A .5 mil film of the resin cured without catalyst at 100° C. in 5 to 15 hours. With less than 1 percent of cobalt octoate as catalyst, the resin cured to a hard, clear film in 29 to 40 hours at room temperature.

*Example 3*

A mixture of 1820 parts linseed oil and 458 parts pentaerythritol was heated with calcium acetate as catalyst in a standard alcoholysis reaction. A mixture of 845 parts of a copolymeric methoxylated siloxane resin containing 33 mol percent phenylsiloxane units and 67 mol percent phenylmethylsiloxane units and having 20 percent residual methoxy groups and 1 part butyl titanate was added to the linseed oil-pentaerythritol reaction mass and heated and stirred 200° to 210° C. for 3 hours. Methanol distilled over during the heating. Next, 551 parts phthalic anhydride was added to the reaction mass and heating at reflux was continued until a homogeneous, single phase resin of the desired viscosity was obtained. The reaction mass was filtered and diluted to 59 percent solids in Stoddard solvent. This solution had a specific gravity of .950 and a viscosity of 69 cs. at 25° C. This silicone modified-oil modified-alkyd resin formed clear hard films on curing and is suitable for use in protective coatings.

*Example 4*

When glycerine, sorbitol, neopentyl glycol or diethanol amine is substituted for the trimethylolpropane in Example 1, an excellent silicone-alkyd resin suitable for use in protective coatings such as paints and varnishes is obtained.

*Example 5*

A three-necked, 1 liter capacity flask was loaded with 120 g. of a preformed short oil modified alkyd prepared by reacting glycerol, phthalic anhydride and cocoanut oil acid, 120 g. of a siloxane resin copolymer of 70 mol percent phenylsiloxane units and 30 mol percent n-propylsiloxane units, containing residual OH groups (OH/Si about 1/3), 220 g. of xylene and 1 g. of tetrabutyl titanate. The flask was fitted with thermometer, stirring rod and reflux condenser. The mixture was heated with concurrent stirring to reflux (about 140° C.). After 1 hour 40 minutes a compatible reaction product which cured to a clear film was obtained. A solution of the resin in xylene (56.2 percent solids) had a viscosity at 25° C. of 572 cps. and a specific gravity of 1.048. The procedure outlined above was repeated with the same materials in the same quantities except that the titanate was not employed. A comparable resin was obtained after heating the reaction mass 6 hours and 15 minutes which is 3.75 times as long as the heating period for the mass with the titanate present.

That which is claimed is:

1. A method of preparing a coating resin comprising reacting by heating together a combination selected from the group consisting of (1) a combination of ($a$) a polyhydric alcohol, ($b$) a polycarboxylic compound selected from the group consisting of polycarboxylic acids, anhydrides of said acids and esters of said acids, ($c$) a fatty acid and ($d$) an organosiloxane resin made up of units of the general formula $$R_nSi(OR')_mO_{\frac{4-n-m}{2}}$$

in which each R is a monovalent hydrocarbon radical, each R' is a substituent selected from the group consisting of the hydrogen atom and alkyl radicals of less than six carbon atoms, $n$ has an average value of from 0.90 to 1.90 and $m$ has an average value of from 0.1 to 1.5, and (2) a combination of ($a$), ($b$) and ($d$), in any case said organosiloxane resin being employed in an amount equal to from 0.5 to 90 percent by weight based on the combined weight of ($a$), ($b$), ($c$) and ($d$), said organosiloxane resin being employed in contact with a metallic compound selected from the group consisting of esters of the formula $M(OR'')_4$ and partial hydrolyzates of said esters, in which M is an atom selected from the group consisting of titanium and zerconium and each R'' is a substituent selected from the group consisting of the hydrogen atom, monovalent hydrocarbon radicals and monovalent acyl radicals, said metallic compound being present in an amount sufficient to provide from 0.01 to 3.0 percent by weight of M based on the combined weight of ($a$), ($b$), ($c$) and ($d$), the reaction temperature subsequent to the addition of ($d$) to the system being limited to the range from 100° to 210° C., said heating being continued until a compatible resin is obtained.

2. A method of preparing a coating resin comprising reacting by heating at a temperature of from 100° to 210° C. until a compatible resin is obtained a preformed organic resin selected from the group consisting of alkyds and oil modified alkyds with an organosiloxane resin made up of units of the general formula $$R_nSi(OR')_mO_{\frac{4-n-m}{2}}$$

in which each R is a nonvalent hydrocarbon radical, each R' is a substituent selected from the group consisting of the hydrogen atom and alkyl radicals of less than six carbon atoms, $n$ has an average value of from 0.90 to 1.90 and $m$ has an average value of from 0.1 to 1.5, said organosiloxane resin being present in an amount equal to from 0.5 to 90 percent by weight based on the combined weight of said organic and organosiloxane resins, in contact with a metallic compound selected from the group consisting of esters of the formula $M(OR'')_4$ and partial hydrolyzates of said esters, in which M is an atom selected from the group consisting of titanium and zirconium and each R'' is a substituent selected from the group consisting of the hydrogen atom, monovalent hydrocarbon radicals and monovalent acyl radicals, said metallic compound being present in an amount sufficient to provide from 0.01 to 3.0 percent by weight of M based on the combined weight of said organic and organosiloxane resins.

References Cited in the file of this patent

UNITED STATES PATENTS

| | | |
|---|---|---|
| 2,680,723 | Kronstein | June 8, 1954 |
| 2,718,508 | Rauner | Sept. 20, 1955 |
| 2,721,854 | Kohl | Oct. 25, 1955 |
| 2,877,202 | Olson | Mar. 10, 1959 |

FOREIGN PATENTS

| | | |
|---|---|---|
| 504,115 | Canada | July 6, 1954 |

UNITED STATES PATENT OFFICE
CERTIFICATE OF CORRECTION

Patent No. 3,015,637 January 2, 1962

Lawrence A. Rauner et al.

It is hereby certified that error appears in the above numbered patent requiring correction and that the said Letters Patent should read as corrected below.

Column 6, line 21, for "nonvalent" read -- monovalent --.

Signed and sealed this 7th day of August 1962.

(SEAL)
Attest:

ERNEST W. SWIDER
Attesting Officer

DAVID L. LADD
Commissioner of Patents